(12) United States Patent
Neshyba

(10) Patent No.: US 11,102,973 B2
(45) Date of Patent: Aug. 31, 2021

(54) HUNTING STAND APPARATUS AND METHOD

(71) Applicant: Val Neshyba, Katy, TX (US)

(72) Inventor: Val Neshyba, Katy, TX (US)

( * ) Notice: Subject to any disclaimer, the term of this patent is extended or adjusted under 35 U.S.C. 154(b) by 378 days.

(21) Appl. No.: 16/382,939

(22) Filed: Apr. 12, 2019

(65) Prior Publication Data

US 2020/0323195 A1    Oct. 15, 2020

(51) Int. Cl.
*A01M 31/02* (2006.01)
*E04H 15/48* (2006.01)
*E04H 15/00* (2006.01)

(52) U.S. Cl.
CPC .......... *A01M 31/025* (2013.01); *A01M 31/02* (2013.01); *E04H 15/001* (2013.01); *E04H 15/48* (2013.01)

(58) Field of Classification Search
CPC ... A01M 31/025; A01M 31/02; E04H 15/001; A47D 13/04; F41A 23/00; F41A 23/02; F41A 23/12; F41A 23/14; F41A 23/16; F41A 23/56; A47B 9/14; A47B 2009/145; A47B 13/16; A47B 37/04
USPC ........... 108/25–26, 166–169, 144.11, 147.19
See application file for complete search history.

(56) References Cited

U.S. PATENT DOCUMENTS

| | | | |
|---|---|---|---|
| 4,506,466 A * | 3/1985 | Hall | F41A 23/00 108/115 |
| 4,535,559 A * | 8/1985 | Hall | F41A 23/00 42/94 |
| 4,545,144 A * | 10/1985 | Schuster | F41A 23/00 108/27 |
| 4,702,029 A * | 10/1987 | DeVaul | F41C 33/06 42/94 |
| 5,010,909 A * | 4/1991 | Cleveland | E04H 15/001 135/119 |
| 5,284,280 A * | 2/1994 | Stonebraker, Sr. | A45F 4/02 224/153 |
| 5,295,556 A * | 3/1994 | Mullin | A01M 31/025 182/116 |
| 5,491,921 A * | 2/1996 | Allen | F41A 23/28 42/94 |
| 5,697,180 A * | 12/1997 | Morizio | F41A 23/02 42/94 |
| 5,778,800 A * | 7/1998 | Liang | A47B 88/493 108/26 |
| 6,119,812 A * | 9/2000 | Chin | A01M 31/02 182/223 |
| 6,860,055 B1 * | 3/2005 | Walrath | F41A 23/16 211/64 |

(Continued)

*Primary Examiner* — David R Dunn
*Assistant Examiner* — Danielle Jackson
(74) *Attorney, Agent, or Firm* — Darryl Edwin Scott

(57) ABSTRACT

A collapsible hunting stand having a first shooting bench having a north shooting bench. A first east shooting bench, a first west shooting bench, and a second shooting bench pivotally coupled to the first shooting bench. The second shooting bench having a south shooting bench, a second east shooting bench, and a second west shooting bench. A first telescopic leg pivotally coupled to the first shooting bench. A second telescopic leg pivotally coupled to the first shooting bench. A third telescopic leg pivotally coupled to the second shooting bench. A fourth telescopic leg pivotally coupled to the second shooting bench. A hunting station enclosed by the first shooting bench and the second shooting bench.

17 Claims, 6 Drawing Sheets

(56) References Cited

U.S. PATENT DOCUMENTS

| | | | | |
|---|---|---|---|---|
| 8,307,576 B1* | 11/2012 | Bogart | .................... | F41A 23/16 |
| | | | | 42/94 |
| 8,789,548 B2* | 7/2014 | Atherton | ............. | A01M 31/025 |
| | | | | 135/88.13 |
| 8,931,193 B1* | 1/2015 | Bogart | .................... | F41A 23/16 |
| | | | | 42/1.06 |
| 9,591,924 B1* | 3/2017 | O'Neal | .................... | A47C 7/66 |
| 10,849,321 B2* | 12/2020 | Peel | ......................... | E04H 3/28 |
| 2005/0204963 A1* | 9/2005 | Robinson | ............... | A47B 13/16 |
| | | | | 108/25 |
| 2007/0056482 A1* | 3/2007 | Robinson | ............... | A47B 37/04 |
| | | | | 108/25 |
| 2010/0089294 A1* | 4/2010 | Medina | ................. | A47B 3/0913 |
| | | | | 108/25 |
| 2015/0320213 A1* | 11/2015 | Sorrell | .................... | A47B 9/04 |
| | | | | 108/27 |

* cited by examiner

HUNTING STAND APPARATUS AND METHOD

BACKGROUND

Hunting is a sport that requires strategic planning, patience, focus, and a keen understanding of a targeted animal's routine. Using high quality optics, a hunter may sit in a static position for hours maintaining constant vigilance in all directions while waiting for a trophy to emerge. During this time, even the most subtle movement could startle prey causing a missed harvest opportunity and resulting in disappointment. Further, the use of a cumbersome firearm such as a crossbow or rifle is often challenging, especially during times when the hunter is pressured to quickly shift physical positions in order to execute a solidly supported lethal shot without being detected.

DETAILED DESCRIPTION

Figure 2:
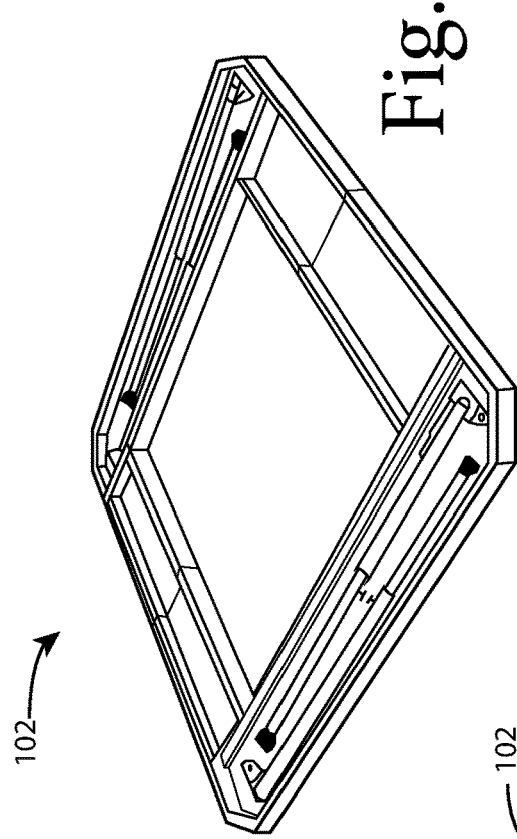
FIG. 2 is a perspective view of a collapsible hunting stand showing a bottom surface of a first shooting bench and a second shooting bench.

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Sport hunting is a lucrative business which has reported growths ranging up to 9% annually. It is estimated that one in every $100 US dollar is spent on hunting and hunting accessories. For example, in 2017 there were over 36.8 million hunting licenses sold in the United States and its estimated that each licensed hunter spends thousands of dollars purchasing hunting leases, ammunition, feeder supplies, feed, game cameras, ATV's, etc.

Hunting is challenging. For example, the whitetail deer evades many hunters because they possess a keen since of smell and ability to detect movement. Deer hunting requires patiently sitting for hours at a time in what is commonly referred to in the industry as "deer stands."

Although many types of weapons can be used for hunting, using a firearm has been the preferred weapon of choice. As the sport has grown in popularity, other weapon systems seasons were introduced.

For example, archery, crossbow, and muzzle loader rifle seasons were made available that expanded existing hunting seasons and encouraged encroachment within more human populated urban areas. For example, this action enabled more hunters to assist in the control and containment of an unexpected explosive rise in deer populations that were increasingly threatening agriculture and travel safety. Subsequently, the available use of additional weapon systems and the overall expansion of hunting seasons have in turn spurred tremendous growth within the hunting industry.

Notwithstanding the expansion of the hunting season and the many forms of weaponry available to the hunter, hunting is a sport that requires strategic planning, patience, focus, and a keen understanding of an animal's routine. Hunters may sit in a static position for hours waiting on prey to cross their path. Any non-concealed sudden movement by the hunter may alert targeted prey and result in the animal's escape. Further, the use of cumbersome firearms (such as a crossbow or rifle) can constrain the hunter's mobility. The hunter must be able to change positions without being detected by the animal.

The embodiments described herein include an apparatus and method that allow a hunter to remain in a static position without being detected by prey. The apparatus and method allow the hunter to move and reposition while remaining concealed. Further, the apparatus and method allow the hunter to mount a cumbersome weapon onto a sturdy level surface resulting in increased accuracy when discharging.

Figure 3:
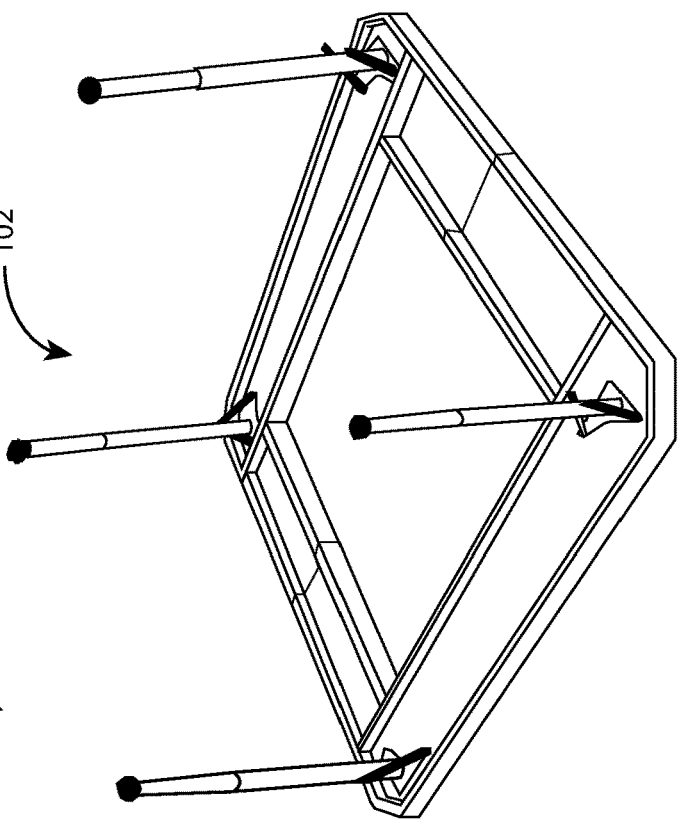
FIG. 3 is a perspective view of a collapsible hunting stand showing a bottom surface of a first shooting bench, a second shooting bench, and four extended telescopic legs.
Figure 1:
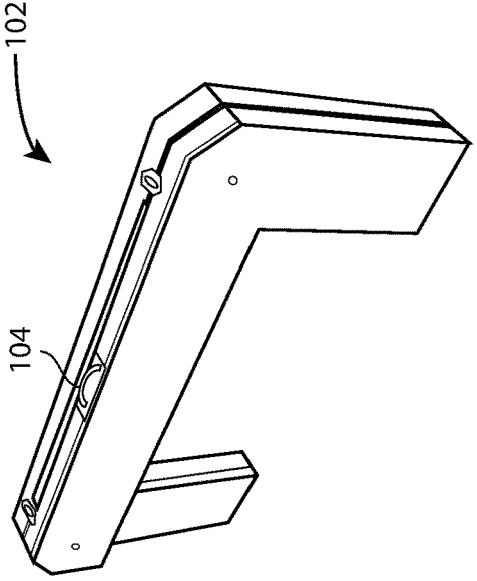
FIG. 1 is a perspective view of a collapsible hunting stand in a transporting configuration.

FIGS. 1-3 illustrate a collapsible hunting stand in multiple configurations. For example, FIG. 1 is a perspective view of a collapsible hunting stand in a transporting configuration. FIG. 2 is a perspective view of a collapsible hunting stand showing a bottom surface of a first shooting bench and a second shooting bench. FIG. 3 is a perspective view of a collapsible hunting stand showing a bottom surface of a first shooting bench, a second shooting bench, and four extended telescopic legs. As illustrated in FIGS. 1-3, the apparatus includes a collapsible hunting stand 102. The collapsible hunting stand 102 may be made from a metal material, a polymer material, a wood material, a combination of metal, polymer, or wood, or any other similar material. In addition, the collapsible hunting stand 102 is lightweight and may have a carrying capacity of between five to thirty-five pounds.

As illustrated in FIG. 1, the collapsible hunting stand 102 can be folded in half for easier transport. In addition, the collapsible hunting stand 102 may include a handle 104 for a hunter (not shown) to use when transporting the collapsible hunting stand 102 from one location to another. The handle 104 may also be a shoulder strap. As illustrated in FIGS. 2-3, the collapsible hunting stand 102 can be unfolded from its transport position to a hunting configuration. Note, FIG. 3, shows the undercarriage of the collapsible hunting stand 102 to illustrate the method by which the collapsible hunting stand 102 is opened and is not to be interpreted as the actual position of the collapsible hunting stand 102 in the preferred hunting position.

Figure 4:
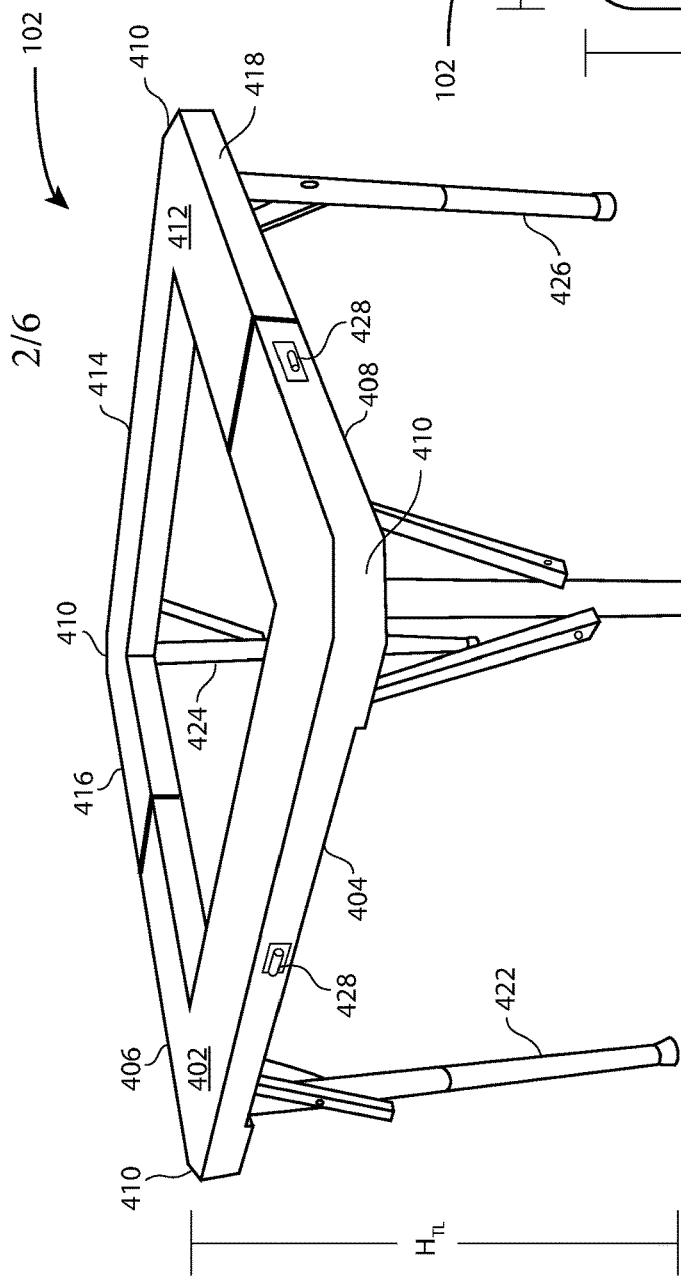
FIG. 4 is a perspective view of a collapsible hunting stand.

FIG. 4 is a perspective view of a collapsible hunting stand. Note, FIG. 4 illustrates the collapsible hunting stand in the intended hunting position. As illustrated in FIG. 4, the collapsible hunting stand 102 may include a first shooting bench 402. In one or more embodiments, the first shooting bench 402 includes a north shooting bench 404. The first shooting bench 402 may be integrally coupled to a first east shooting bench 406. Further, the first shooting bench 402 may be integrally coupled to a first west shooting bench 408. In one or more embodiments, the first shooting bench 402 forms a semi-circle. In another embodiment, the first shooting bench 404 forms a "U" shape such that the north shooting bench 404 and the first east shooting bench 406 forms a ninety-degree angle; and the north shooting bench 404 and the first west shooting bench 408 forms a ninety-degree angle. In one or more embodiments, the first shooting bench 402 includes beveled corners 410 to reduce the chances of snagging when placing a ground blind (described below in connection with FIG. 7) over the collapsible hunting stand 102. In one or more embodiments, the beveled corners 410 have a shear length of between two inches and five inches.

In one or more embodiments, the collapsible hunting stand 102 may include a second shooting bench 412. In one or more embodiments, the second shooting bench 412 includes a south shooting bench 414. The second shooting bench 412 may be integrally coupled to a second east shooting bench 416. Further, the second shooting bench 412 may be integrally coupled to a second west shooting bench 418. In one or more embodiments, the second shooting bench 412 may form a semi-circle. In another embodiment, the second shooting bench 412 forms a "U" shape such that the south shooting bench 414 and the second east shooting bench 416 forms a ninety-degree angle; and the south shooting bench 414 and the second west shooting bench 418 forms a ninety-degree angle. In one or more embodiments, the second shooting bench 412 includes beveled corners 410 to reduce the chances of snagging when placing a ground blind (described below in connection with FIG. 7) over the collapsible hunting stand 102. In one or more embodiments, the thickness of the first shooting bench 402 and the second shooting bench 412 is between one inch and three inches.

The collapsible hunting stand 102 may include telescopic legs for adjusting the first shooting bench 402 and the second shooting bench 412 to a desired level based on the hunter's parameters. For example, as illustrated in FIG. 4, the first shooting bench 402 may include a first telescopic leg 420 pivotally coupled to the first shooting bench 402. The first shooting bench 402 may include a second telescopic leg 422 pivotally coupled to the first shooting bench 402. As described in connection to FIGS. 1-3, the first telescopic leg 420 and the second telescopic leg 422 pivots and folds into the north shooting bench 404 for easier transport. Further, the second shooting bench 412 may include a third telescopic leg 424 pivotally coupled to the second shooting bench 412. The second shooting bench 412 may include a fourth telescopic leg 426 pivotally coupled to the second shooting bench 412. As described in connection to FIGS. 1-3, the third telescopic leg 424 and the fourth telescopic leg 426 pivots and folds into the south shooting bench 414 for easier transport. The telescopic legs 420, 422, 424, and 426 may pivot about a device (such as a hinge, which is not shown for clarity) connected between the telescopic legs 420, 422, 424, and 426 and the bottom surface of the hunting stand 102. The telescopic legs may lock in place once pivoted away from the bottom surface of the hunting stand 102.

The telescopic legs 420, 422, 424, and 426 may extend to a height $H_{TL}$ such that the top of the collapsible hunting stand 102 is between twenty-eight inches and forty-two inches. The telescopic legs 420, 422, 424, and 426 may each individually include a stake (not shown) for implanting into the ground to secure the collapsible hunting stand 102 in place. In addition, the telescopic legs 420, 420, 424, and 426 may include rubber leg footings to assist in minimizing slipping or sinking anchor points.

In one or more embodiments, the collapsible hunting stand 102 includes mounted levelers 428. The mounted levelers 428 may be bubble levelers. The mounted levelers 428 may be electronic levelers. The mounted levelers 428 allow the hunter (not shown) to balance the surface level of the collapsible hunting stand 102 for improved accuracy when hunting.

Figure 5:
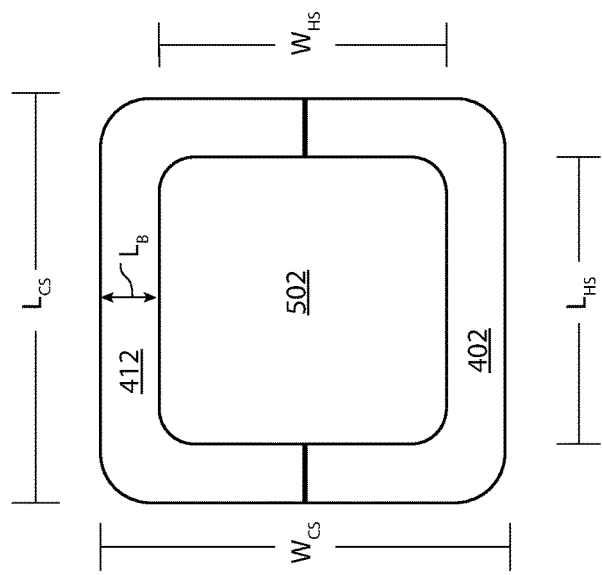
FIG. 5 is an aerial view of a collapsible hunting stand.

FIG. 5 is an aerial view of a collapsible hunting stand. As illustrated, the collapsible hunting stand 102 may have a length $L_{CS}$ that is greater than forty-seven inches and less than sixty-one inches. Further, the collapsible hunting stand 102 may have a width $W_{CS}$ that is greater than forty-seven inches and less than sixty-one inches. In one or embodiments, the collapsible hunting stand 102 includes a hunting station 502. The hunting station 502 is the open spaced enclosed by the first shooting bench 402 and second shooting bench 412. In operation, the hunter (not shown) enters the hunting station 502 and positions themselves in the hunting station 502 and either mounts their weapon on the first shooting bench 402 or the second shooting bench 412.

As further illustrated in FIG. 5, the hunting station 502 may have a length $L_{HS}$ and a width $W_{HS}$. In one or more embodiments, the hunting station 502 length $L_{HS}$ is greater than twenty-four inches and less than thirty-seven inches. In one or more embodiments, the hunting station 502 width $W_{HS}$ is greater than twenty-four inches and less than thirty-seven inches. Further, in another embodiment, the hunting station 502 length $L_{HS}$ equals the hunting station width $W_{HS}$. In one or more embodiments, the hunting station 502 has an interior operating area of at least 1,024 inches$^2$. In another embodiment, the hunting station 502 has an interior operating area of least 625 inches$^2$. The first shooting bench 402 and the second shooting bench 412 may have a bench length LB. The bench length LB may be greater than six inches and less than ten inches. Having a bench length LB allows a hunter the necessary space to mount a weapon on the collapsible hunting stand 102. The weapon may require supporting and stabilizing components such as a tri-pod, tack drivers, sand bags, etc.

Figure 6:
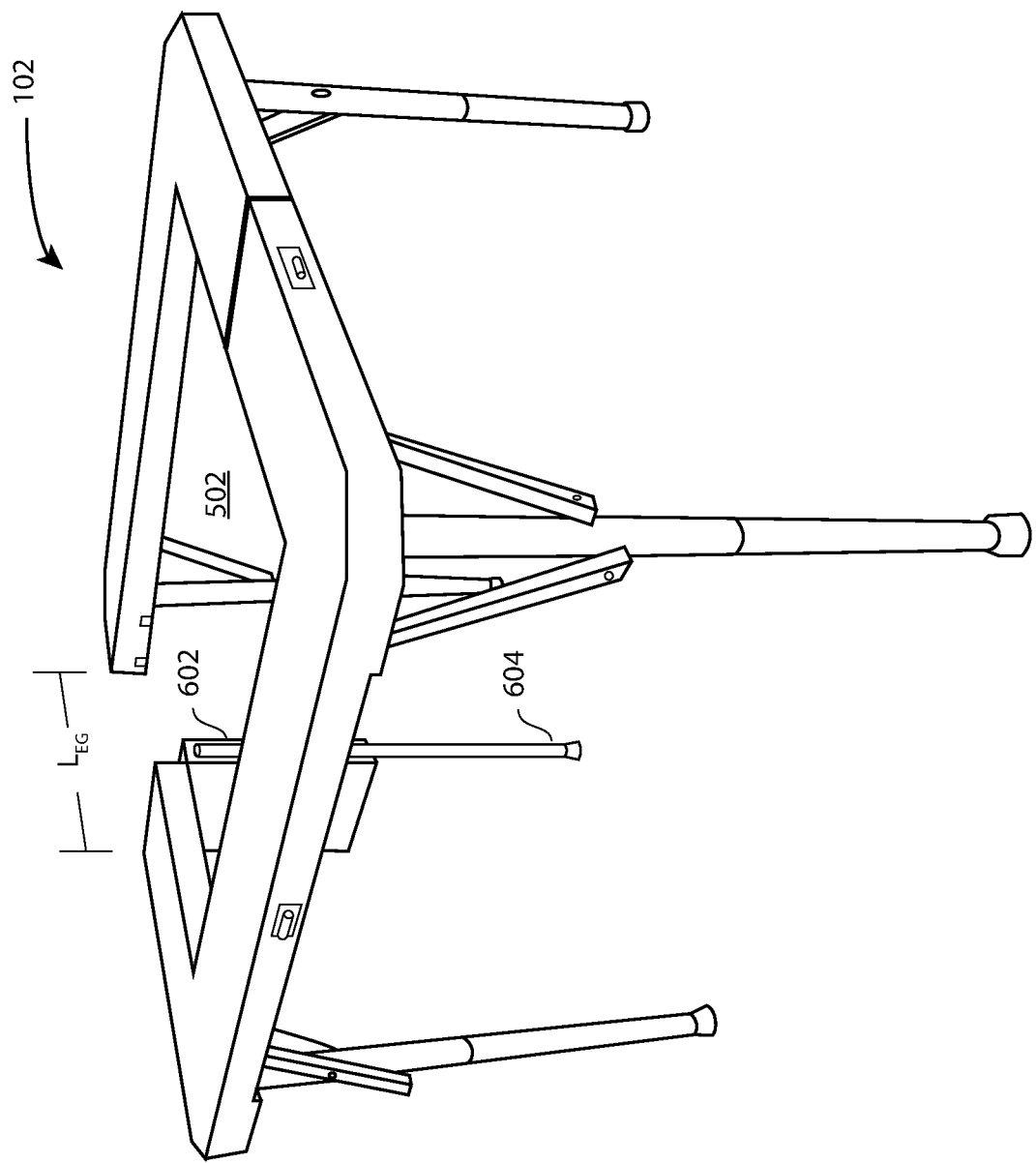
FIG. 6 is a perspective view of a collapsible hunting stand with an entry gate.

FIG. 6 is a perspective view of a collapsible hunting stand with an entry gate. As illustrated in FIG. 6, the collapsible hunting stand 102 may include an entry gate 602. Note, the collapsible hunting stand 102 described in connection with FIG. 6 includes all the embodiments and variations described in connection with FIGS. 1-5, except that FIG. 6 includes the entry gate 602. In one or more embodiments, the entry gate 602 is mounted by pivotal joints to allow the entry gate 602 to open and close to allow the hunter (not shown) to enter the hunting station 502. The entry gate 602 may have an entry gate length LEG that is greater than fifteen inches and less than twenty inches. The entry gate 602 may have a tubular telescopic attachment 604 that is mounted along its longest edge allowing for vertical extension to a ground surface for additional shooting bench support when the entry gate 602 is in an open position.

In one or more embodiments, the collapsible hunting stand 102 includes bench leaves (not shown) to allow the collapsible hunting stand 102 to extend its length or width when necessary.

Figure 7:
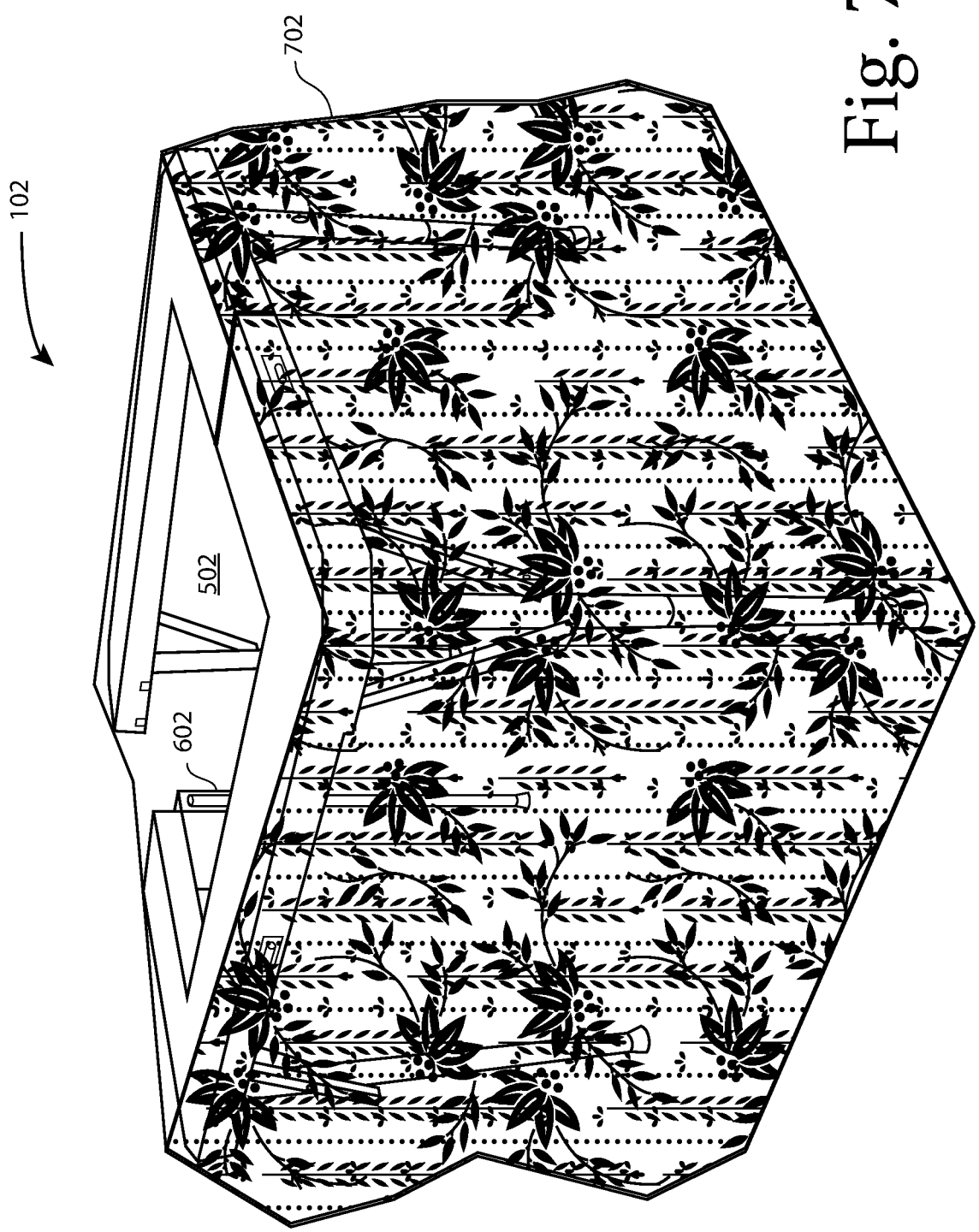
FIG. 7 is a perspective view of a collapsible hunting stand with an entry gate and an external camouflage cover.

FIG. 7 is a perspective view of a collapsible hunting stand with an entry gate and an external camouflage cover. As illustrated in FIG. 7, the collapsible hunting stand 102 may include an external camouflage cover 702. While the hunter is stationed in the collapsible hunting stand 102, the external camouflage cover 702 provides a hunter discovery concealment from unsuspecting prey. To further enhance concealment, the collapsible hunting stand 102 may be equipped with small elastic bungee straps and connection ports along and around the external perimeter to hold and retain cut samples of surrounding vegetation. Note, the collapsible hunting stand 102 described in connection with FIG. 7 includes all the embodiments and variations described in connection with FIGS. 1-6, except that FIG. 7 includes the external camouflage cover 702. In addition, the collapsible hunting stand 102 may include other components, such as a cell phone holder, universal serial bus (USB) ports, mounted light emitting diode (LED) lights, recessed trays for holding accessories, cup holders, etc.

Figure 8:
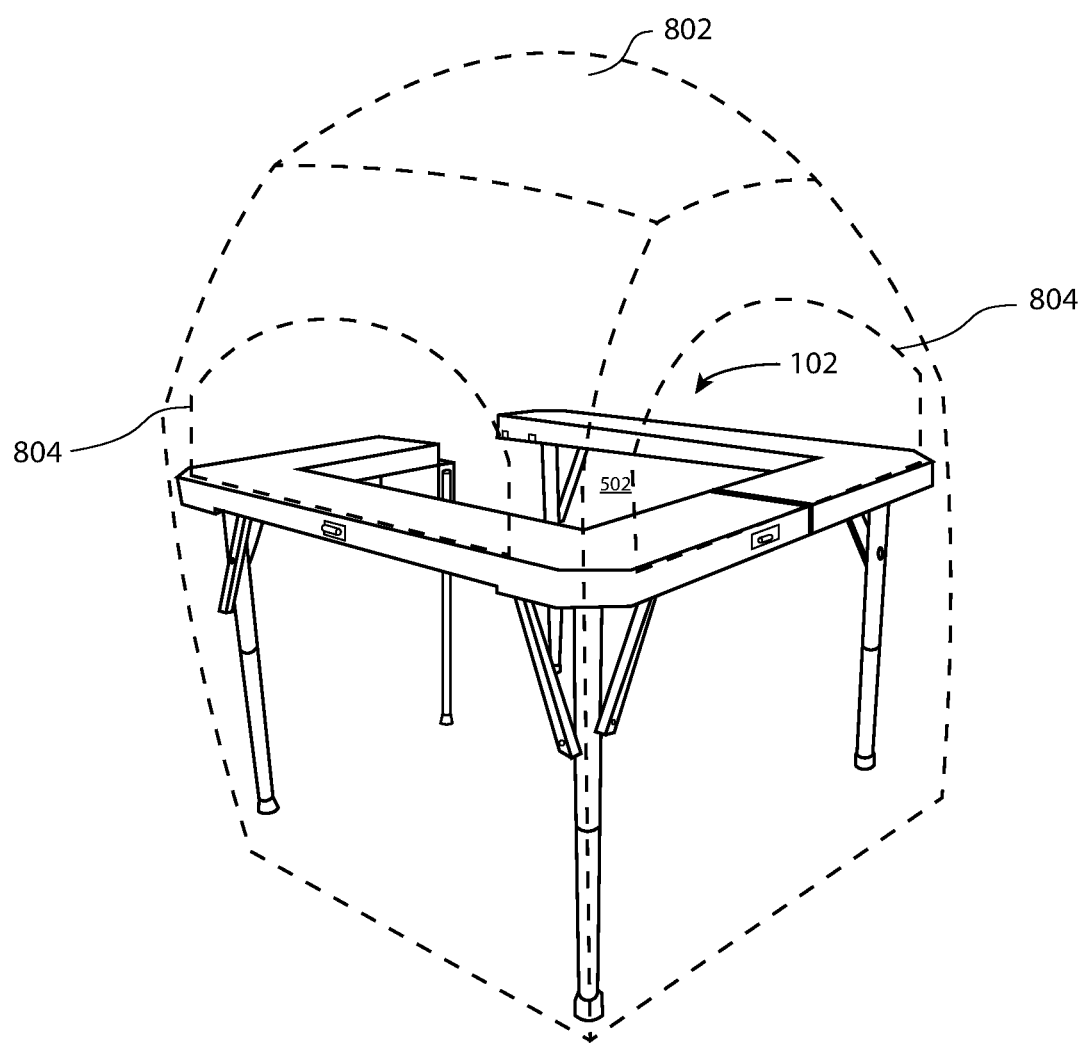
FIG. 8 is a perspective view of a collapsible hunting stand with an entry gate enclosed by a ground blind.

FIG. 8 is a perspective view of a collapsible hunting stand with an entry gate enclosed by a ground blind. As illustrated in FIG. 8, the collapsible hunting stand 102 may include a ground blind 802. Note, the ground blind 802 is illustrated as being translucent for clarity; however, the ground blind 802 provides the hunter with cover and may have a camouflage pattern to keep the hunter from being detected by an animal. Further, the collapsible hunting stand 102 described in connection with FIG. 8 may include all the embodiments and variations described in connection with FIGS. 1-6, except that FIG. 8 includes the ground blind 802. In one or more embodiments, the ground blind 802 may have a window 804 to allow the hunter (not shown) to visually see the animal they're hunting with a 360-degree view (Note only two windows 804 are shown for clarity).

Figure 9:
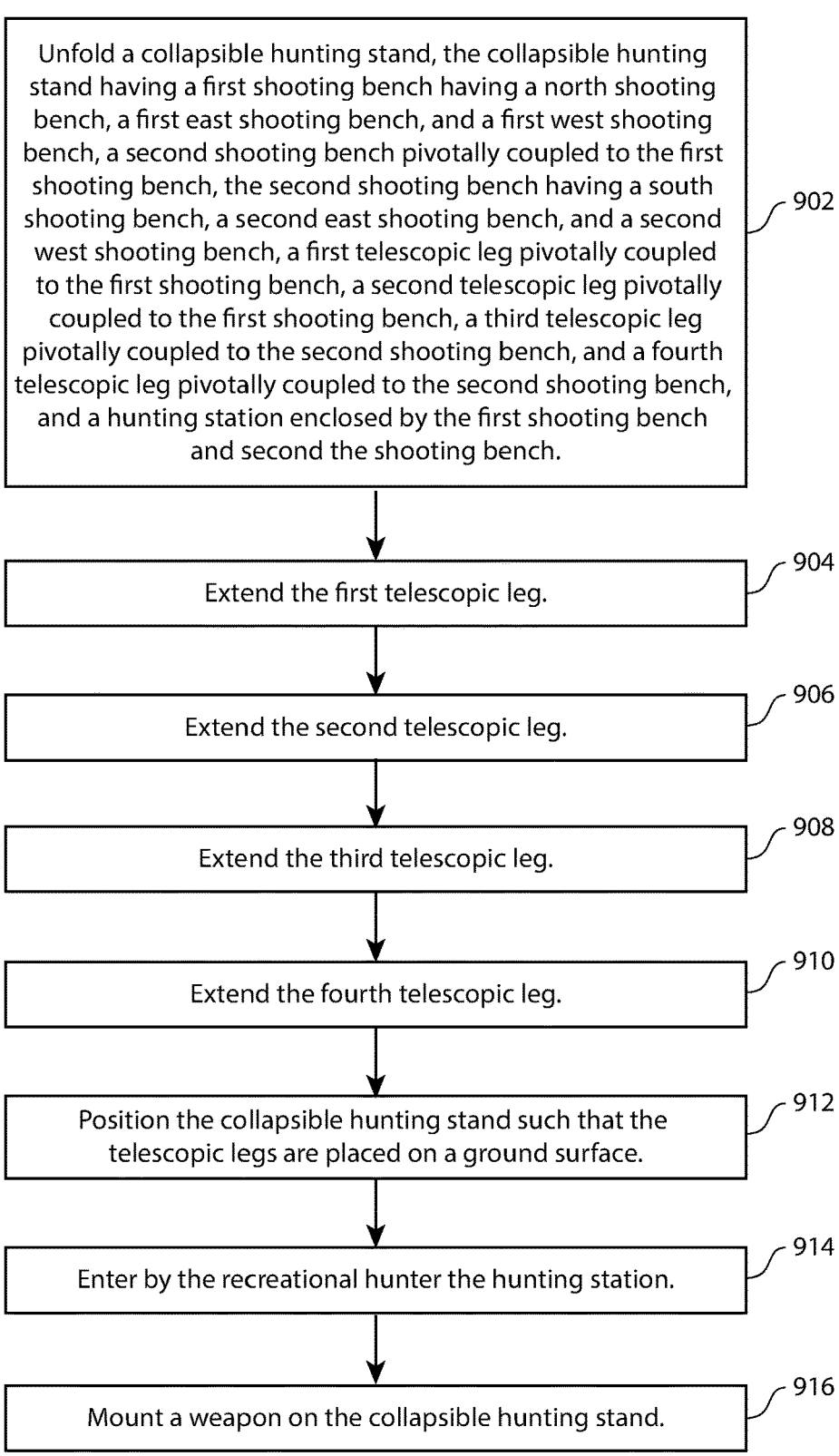
FIG. 9 is a flow chart of a method for using a collapsible hunting stand.

FIG. 9 is a flow chart of a method for using a collapsible hunting stand. In operation, the method includes unfolding a collapsible hunting stand (such as collapsible hunting stand 102), the collapsible hunting stand (such as collapsible hunting stand 102) having a first shooting bench (such as first shooting bench 402) having a north shooting bench (such as north shooting bench 404), a first east shooting bench (such as first east shooting bench 406), and a first west shooting bench (such as first west shooting bench 408), a second shooting bench (such as second shooting bench 412) pivotally coupled to the first shooting bench (such as first shooting bench 402), the second shooting bench (such as second shooting bench 412) having a south shooting bench (such as south shooting bench 414), a second east shooting bench (second east shooting bench 416), and a second west shooting bench (such as second west shooting bench 418), a first telescopic leg (such as first telescopic leg 420) pivotally coupled to the first shooting bench (such as first shooting bench 402), a second telescopic leg (such as second telescopic leg 422) pivotally coupled to the first shooting bench (such as first shooting bench 402), a third telescopic leg (such as third telescopic leg 424) pivotally coupled to the second shooting bench (such as second shooting bench 412), and a fourth telescopic leg (such as fourth telescopic leg 426) pivotally coupled to the second shooting bench (such as second shooting bench 412), and a hunting station (such as hunting station 502) enclosed by the first shooting bench (such as first shooting bench 402) and the second shooting bench (such as second shooting bench 412) (block 902). Extending the first telescopic leg (such as first telescopic leg 420) (block 904). Extending the second telescopic leg (such as second telescopic leg 422) (block 906). Extending the third telescopic leg (such as third telescopic leg 424) (block 908). Extending the fourth telescopic leg (such as fourth telescopic leg 426) (block 910). Positioning the collapsible hunting stand (such as collapsible hunting stand 102) such that the telescopic legs (such as telescopic legs 420, 422, 424, 426) are placed on a surface of a ground (block 912). Entering by the recreational hunter the hunting station (such as hunting station 102) (block 914). Mounting a weapon on the collapsible hunting stand (such as collapsible hunting stand 102).

In one aspect the apparatus includes a collapsible hunting stand. The collapsible hunting stand has a first shooting bench. The first shooting bench has a north shooting bench, a first east shooting bench, and a first west shooting bench. The collapsible hunting stand has a second shooting bench pivotally coupled to the first shooting bench. The second shooting bench has a south shooting bench, a second east shooting bench, and a second west shooting bench. The collapsible hunting stand has a first telescopic leg pivotally coupled to the first shooting bench. The collapsible hunting stand has a second telescopic leg pivotally coupled to the first shooting bench. The collapsible hunting stand has a third telescopic leg pivotally coupled to the second shooting bench. The collapsible hunting stand has a fourth telescopic leg pivotally coupled to the second shooting bench. The collapsible hunting stand has a hunting station enclosed by the first shooting bench and the second shooting bench.

Implementations may include one or more of the following. The collapsible hunting stand may include an external camouflage cover. The collapsible hunting stand may include an entry gate having a tubular telescopic attachment that may be coupled to the entry gate such that the tubular telescopic attachment vertically extends to a ground surface when the entry gate is in an open position. The collapsible hunting stand may include mounted levelers. The collapsible hunting stand may have a length $L_{CS}$ that is greater than 47 inches and less than 61 inches. The collapsible hunting stand may have a width $W_{CS}$ that is greater than 47 inches and less than 61 inches. The hunting station may have an interior area of at least 625 inches$^2$.

In one aspect the apparatus includes a ground blind. The ground blind includes a collapsible hunting stand. The collapsible hunting stand has a first shooting bench. The first shooting bench has a north shooting bench, a first east shooting bench, and a first west shooting bench. The collapsible hunting stand has a second shooting bench pivotally coupled to the first shooting bench. The second shooting bench has a south shooting bench, a second east shooting bench, and a second west shooting bench. The collapsible hunting stand has a first telescopic leg pivotally coupled to the first shooting bench. The collapsible hunting stand has a second telescopic leg pivotally coupled to the first shooting bench. The collapsible hunting stand has a third telescopic leg pivotally coupled to the second shooting bench. The collapsible hunting stand has a fourth telescopic leg pivotally coupled to the second shooting bench. The collapsible hunting stand has a hunting station enclosed by the first shooting bench and the second shooting bench.

Implementation may include one or more of the following. The collapsible hunting stand may include an entry gate having a tubular telescopic attachment that may be coupled to the entry gate such that the tubular telescopic attachment vertically extends to a ground surface when the entry gate is in an open position. The collapsible hunting stand may include mounted levelers. The collapsible hunting stand may have a length $L_{CS}$ that is greater than 47 inches and less than 61 inches. The collapsible hunting stand may have a width $W_{CS}$ that is greater than 47 inches and less than 61 inches. The hunting station may have an interior area of at least 625 inches$^2$.

In one aspect, a method includes unfolding a collapsible hunting stand. The collapsible hunting stand has a first shooting bench. The first shooting bench has a north shooting bench, a first east shooting bench, and a first west shooting bench. The collapsible hunting stand has a second shooting bench pivotally coupled to the first shooting bench. The second shooting bench has a south shooting bench, a second east shooting bench, and a second west shooting bench. The collapsible hunting stand has a first telescopic leg pivotally coupled to the first shooting bench. The collapsible hunting stand has a second telescopic leg pivotally coupled to the first shooting bench. The collapsible hunting stand has a third telescopic leg pivotally coupled to the second shooting bench. The collapsible hunting stand has a fourth telescopic leg pivotally coupled to the second shooting bench. The collapsible hunting stand has a hunting station enclosed by the first shooting bench and the second shooting bench. The method includes extending the first telescopic leg, extending the second telescopic leg, extending the third telescopic leg, and extending the fourth telescopic leg. The method includes positioning the collapsible hunting stand such that the telescopic legs are placed on a ground surface. The recreational hunter enters the hunting station and mounts the weapon on the collapsible hunting stand.

Implementation includes one or more of the following. The collapsible hunting stand may include an external camouflage cover. The collapsible hunting stand may include an entry gate having a tubular telescopic attachment that may be coupled to the entry gate such that the tubular telescopic attachment vertically extends to a ground surface when the entry gate is in an open position. The collapsible hunting stand may include mounted levelers. The collapsible hunting stand may have a length $L_{CS}$ that is greater than 47 inches and less than 61 inches. The collapsible hunting stand may have a width $W_{CS}$ that is greater than 47 inches and less than 61 inches. The hunting station may have an interior area of at least 625 inches$^2$.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for recreational hunting comprising:
    a collapsible hunting stand having:
        a first shooting bench having:
            a north shooting bench,
            a first east shooting bench, and
            a first west shooting bench;
        a second shooting bench pivotally coupled to the first shooting bench, the second shooting bench having:
            a south shooting bench,
            a second east shooting bench, and
            a second west shooting bench;
        a first telescopic leg pivotally coupled to the first shooting bench;
        a second telescopic leg pivotally coupled to the first shooting bench;
        a third telescopic leg pivotally coupled to the second shooting bench;
        a fourth telescopic leg pivotally coupled to the second shooting bench; and
        a hunting station enclosed by the first shooting bench and the second shooting bench;
    and an entry gate having a tubular telescopic attachment that is coupled to the entry gate such that the tubular telescopic attachment vertically extends to a ground surface when the entry gate is in an open position.

2. The apparatus of claim 1 wherein the collapsible hunting stand comprises an external camouflage cover.

3. The apparatus of claim 1 wherein the collapsible hunting stand comprises mounted levelers.

4. The apparatus of claim 1 wherein the collapsible hunting stand has a length ($L_{CS}$) that is greater than 47 inches and less than 61 inches.

5. The apparatus of claim 1 wherein the collapsible hunting stand has a width ($W_{CS}$) that is greater than 47 inches and less than 61 inches.

6. The apparatus of claim 1 wherein the hunting station has an interior area of at least 625 inches$^2$.

7. A system for recreational hunting comprising:
    a ground blind;
    a collapsible hunting stand enclosed by the ground blind, the collapsible hunting stand having:
        a first shooting bench having:
            a north shooting bench,
            a first east shooting bench, and
            a first west shooting bench;
        a second shooting bench pivotally coupled to the first shooting bench, the second shooting bench having:
            a south shooting bench,
            a second east shooting bench, and
            a second west shooting bench;
        a first telescopic leg pivotally coupled to the first shooting bench;
        a second telescopic leg pivotally coupled to the first shooting bench;
        a third telescopic leg pivotally coupled to the second shooting bench;
        a fourth telescopic leg pivotally coupled to the second shooting bench; and
    a hunting station enclosed by the first shooting bench and the second shooting bench; and
    an entry gate having a tubular telescopic attachment that is coupled to the entry gate such that the tubular telescopic attachment vertically extends to a ground surface when the entry gate is in an open position.

8. The apparatus of claim 7 wherein the collapsible hunting stand comprises mounted levelers.

9. The apparatus of claim 7 wherein the collapsible hunting stand has a length ($L_{CS}$) that is greater than 47 inches and less than 61 inches.

10. The apparatus of claim 7 wherein the collapsible hunting stand has a width ($W_{CS}$) that is greater than 47 inches and less than 61 inches.

11. The apparatus of claim 7 wherein the hunting station has an interior area of at least 625 inches$^2$.

12. A method for a recreational hunter to rest their weapon on a surface while hunting, the method comprising:
   unfolding a collapsible hunting stand, the collapsible hunting stand having:
      a first shooting bench having:
         a north shooting bench,
         a first east shooting bench, and
         a first west shooting bench;
      a second shooting bench pivotally coupled to the first shooting bench, the second shooting bench having:
         a south shooting bench,
         a second east shooting bench, and
         a second west shooting bench;
      a first telescopic leg pivotally coupled to the first shooting bench;
      a second telescopic leg pivotally coupled to the first shooting bench;
      a third telescopic leg pivotally coupled to the second shooting bench; and
      a fourth telescopic leg pivotally coupled to the second shooting bench; and
      a hunting station enclosed by the first shooting bench and the second shooting bench;
         and an entry gate having a tubular telescopic attachment that is coupled to the entry gate such that the tubular telescopic attachment vertically extends to a ground surface when the entry gate is in an open position,
   extending the first telescopic leg;
   extending the second telescopic leg;
   extending the third telescopic leg;
   extending the fourth telescopic leg;
   positioning the collapsible hunting stand such that the telescopic legs are placed on a ground surface;
   the recreational hunter entering the hunting station through the entry gate; and
   the recreational hunter mounting a weapon on the collapsible hunting stand.

13. The system of claim 12 wherein the collapsible hunting stand comprises an external camouflage cover.

14. The apparatus of claim 12 wherein the collapsible hunting stand comprises mounted levelers.

15. The apparatus of claim 12 wherein the collapsible hunting stand has a length ($L_{CS}$) that is greater than 47 inches and less than 61 inches.

16. The apparatus of claim 12 wherein the collapsible hunting stand has a width ($W_{CS}$) that is greater than 47 inches and less than 61 inches.

17. The apparatus of claim 12 wherein the hunting station has an interior area of at least 625 inches$^2$.

* * * * *